United States Patent
Wells

(10) Patent No.: US 11,843,610 B2
(45) Date of Patent: Dec. 12, 2023

(54) PROVIDING MULTIPLE NAMESPACES

(71) Applicant: Cisco Technology, Inc., San Jose, CA (US)

(72) Inventor: Ian James Wells, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 218 days.

(21) Appl. No.: 16/985,720

(22) Filed: Aug. 5, 2020

(65) Prior Publication Data

US 2021/0218750 A1 Jul. 15, 2021

Related U.S. Application Data

(60) Provisional application No. 62/958,969, filed on Jan. 9, 2020.

(51) Int. Cl.
H04L 29/06 (2006.01)
H04L 29/08 (2006.01)
(Continued)

(52) U.S. Cl.
CPC ........ H04L 63/105 (2013.01); G06F 9/45558 (2013.01); H04L 63/083 (2013.01);
(Continued)

(58) Field of Classification Search
CPC ..... H04L 63/105; H04L 63/083; H04L 63/20; H04L 67/1097; H04L 69/162;
(Continued)

(56) References Cited

U.S. PATENT DOCUMENTS

| 5,913,024 A * | 6/1999 | Green | G06F 9/468 |
| | | | 726/3 |
| 6,366,958 B1 * | 4/2002 | Ainsworth | H04L 9/40 |
| | | | 719/330 |

(Continued)

FOREIGN PATENT DOCUMENTS

| CN | 109542590 A | 3/2019 |
| EP | 3588875 A1 | 1/2020 |
| WO | WO-2020263542 A1 * | 12/2020 ......... G06F 16/1748 |

OTHER PUBLICATIONS

Block, et al., "Increasing Security of Istio Deployments by Removing the Need for Privileged Containers", retrieved from <<https://www.openshift.com/blog/increasing-security-of-istio-deployments-by-removing-the-need-fro-privileged-containers>>, Sep. 17, 2018, 4 pages.

(Continued)

*Primary Examiner* — David R Lazaro
*Assistant Examiner* — Berhanu Shitayewoldetadik
(74) *Attorney, Agent, or Firm* — Lee & Hayes, P.C.

(57) ABSTRACT

This disclosure describes techniques for providing multiple namespace support to application(s) in containers under Kubernetes without breaking containment boundaries or escalating privileges of the application(s). A namespace service executing on a physical server may communicate with contained processes executing on the physical server by utilizing a Unix Domain Socket (UDS) endpoint in the filesystem of each of the containers. the namespace service may execute on the physical server with escalated privileges, allowing the namespace service to create a socket in a namespace and provide access and rights to utilize the socket to process(es) in a separate namespace.

20 Claims, 5 Drawing Sheets

(51) Int. Cl.
*H04L 15/16* (2006.01)
*G06F 15/16* (2006.01)
*G06F 9/455* (2018.01)
*H04L 29/12* (2006.01)
*H04L 12/24* (2006.01)
*G06F 9/54* (2006.01)
*H04L 9/40* (2022.01)
*H04L 69/16* (2022.01)
*H04L 67/1097* (2022.01)
*H04L 69/32* (2022.01)

(52) U.S. Cl.
CPC .......... *H04L 63/20* (2013.01); *H04L 67/1097* (2013.01); *H04L 69/162* (2013.01); *H04L 69/32* (2013.01); *G06F 2009/45587* (2013.01); *G06F 2009/45595* (2013.01)

(58) Field of Classification Search
CPC .............. H04L 69/32; G06F 9/45558; G06F 2009/45587; G06F 2009/45595; G06F 9/455; G06F 9/541
USPC ............................................................ 726/4
See application file for complete search history.

(56) References Cited

U.S. PATENT DOCUMENTS

| | | | | |
|---|---|---|---|---|
| 10,681,133 B2* | 6/2020 | Puleston | | H04L 67/1097 |
| 2002/0107772 A1* | 8/2002 | Jain | | G06Q 20/202 705/37 |
| 2005/0240943 A1* | 10/2005 | Smith | | G06F 3/00 719/328 |
| 2007/0094723 A1* | 4/2007 | Short | | H04L 69/165 726/14 |
| 2008/0104593 A1* | 5/2008 | Parekh | | G06F 9/4881 718/100 |
| 2008/0270422 A1* | 10/2008 | Craft | | G06F 11/1438 707/E17.096 |
| 2009/0259634 A1* | 10/2009 | Honjo | | G06F 9/52 709/203 |
| 2010/0313196 A1* | 12/2010 | De Atley | | G06F 8/61 719/330 |
| 2010/0333116 A1* | 12/2010 | Prahlad | | G06F 3/0649 713/153 |
| 2011/0161988 A1* | 6/2011 | Kashyap | | G06F 9/544 719/319 |
| 2012/0110601 A1* | 5/2012 | Spencer | | G06F 9/445 717/178 |
| 2012/0192207 A1* | 7/2012 | Kashyap | | G06F 9/544 719/319 |
| 2013/0066928 A1* | 3/2013 | Nagaraja | | G06F 9/5022 707/E17.005 |
| 2013/0133061 A1* | 5/2013 | Fainkichen | | G06F 9/45558 726/15 |
| 2014/0181767 A1* | 6/2014 | Kohavi | | G06F 30/398 716/106 |
| 2015/0033324 A1* | 1/2015 | Fainkichen | | H04W 76/10 726/15 |
| 2015/0120928 A1* | 4/2015 | Gummaraju | | H04L 67/1008 718/1 |
| 2016/0127321 A1* | 5/2016 | Fainkichen | | C09J 7/21 726/4 |
| 2016/0335004 A1* | 11/2016 | Jones | | G06F 12/1475 |
| 2018/0004559 A1* | 1/2018 | Geml | | G06F 21/6209 |
| 2018/0007178 A1* | 1/2018 | Subhraveti | | G06F 9/541 |
| 2018/0157524 A1* | 6/2018 | Saxena | | G06N 20/00 |
| 2018/0181451 A1* | 6/2018 | Saxena | | G06F 21/629 |
| 2018/0302443 A1* | 10/2018 | Weiss | | G06F 21/604 |
| 2019/0227840 A1 | 7/2019 | Bacher et al. | | |
| 2019/0306109 A1* | 10/2019 | Masputra | | H04L 63/166 |
| 2020/0076792 A1* | 3/2020 | Ray | | H04L 63/0815 |
| 2020/0117743 A1* | 4/2020 | Shilimkar | | G06F 9/45558 |
| 2020/0252376 A1* | 8/2020 | Feng | | H04L 63/0263 |
| 2021/0109774 A1* | 4/2021 | Chenchev | | G06F 9/542 |

OTHER PUBLICATIONS

Cisco, "ACI Plugin for Red Hat OpenShift Container Architecture and Design Guide", retrieved from <<https://www.cisco.com/c/en/us/td/docs/switches/datacenter/aci/apic/white_papers/Cisco-ACI-CNI-Plugin-for-OpenShift-Architecture-and-Design-Guide>>, Mar. 22, 2019, 89 pages.

Symantec Corporation, "E-Security Begins with Sound Security Policies", Jun. 14, 2001, 23 pages.

Github, "Istio Pod Network Controller", retrieved from <<https://github.com/sabre1041/istio-pod-network-controller>>, Sep. 17, 2019.

The PCT Search Report and Written Opinion dated Mar. 16, 2021 for PCT Application No. PCT/US20/66465, 29 pages.

* cited by examiner

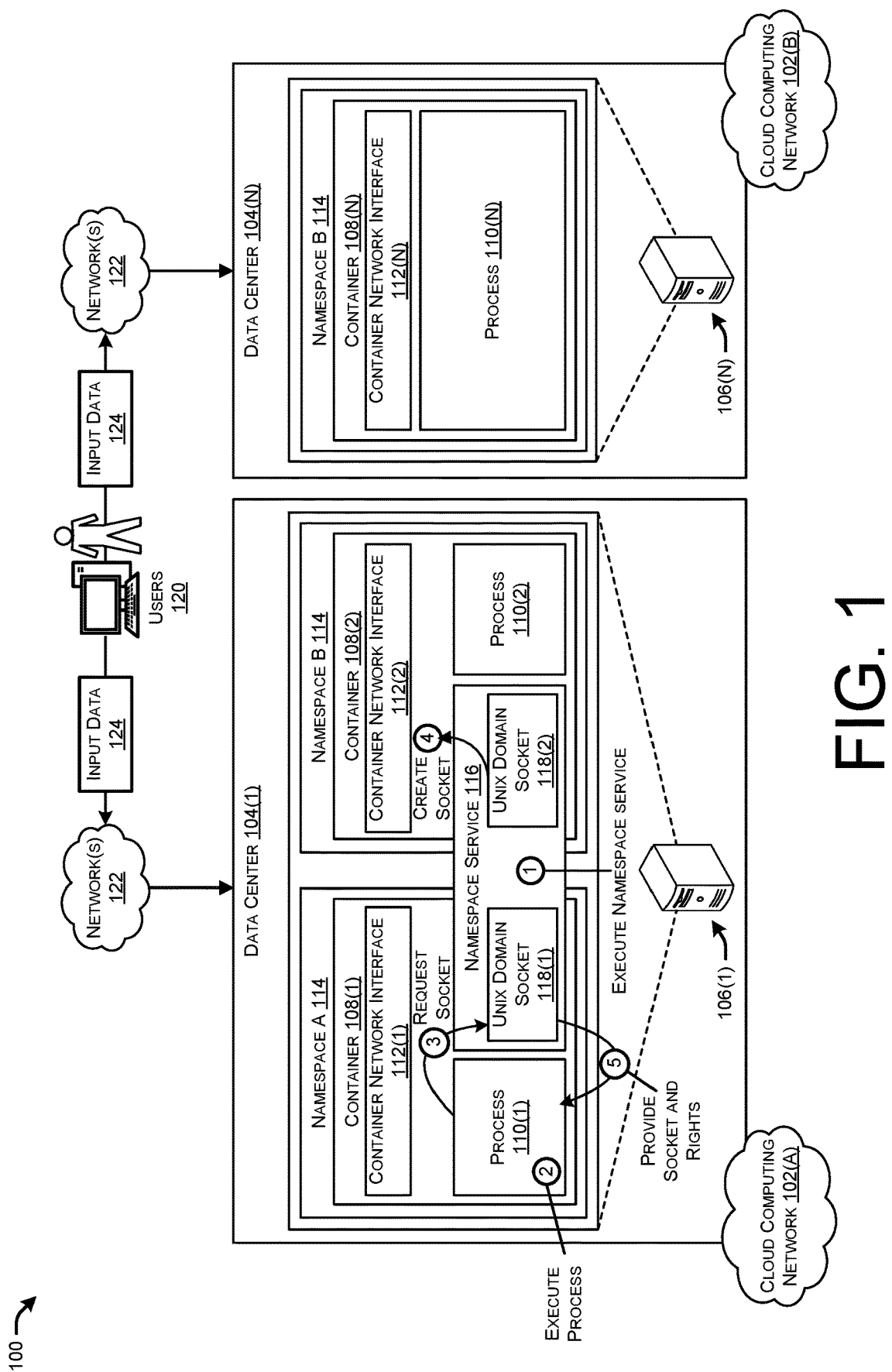

200 ↘

EXECUTE, ON A COMPUTING DEVICE, A PROCESS RUNNING IN A FIRST CONTAINER ASSIGNED TO A FIRST NAMESPACE, THE FIRST CONTAINER BEING ASSIGNED A FIRST PRIVILEGE THAT RESTRICTS ACCESS BY THE FIRST CONTAINER TO THE FIRST NAMESPACE
202

↓

EXECUTE, ON THE COMPUTING DEVICE, A NAMESPACE SERVICE BEING ASSIGNED A SECOND PRIVILEGE THAT ALLOWS THE NAMESPACE SERVICE ACCESS TO THE FIRST NAMESPACE AND A SECOND NAMESPACE
204

↓

RECEIVE, AT THE NAMESPACE SERVICE, A REQUEST FROM THE PROCESS TO CREATE A SOCKET IN THE SECOND NAMESPACE TO ALLOW THE PROCESS TO COMMUNICATE WITH A SECOND CONTAINER IN THE SECOND NAMESPACE
206

↓

CREATE, BY THE NAMESPACE SERVICE, THE SOCKET IN THE SECOND NAMESPACE
208

↓

PROVIDE, FROM THE NAMESPACE SERVICE TO THE PROCESS, A FILE DESCRIPTOR ASSOCIATED WITH THE SOCKET
210

```
┌─────────────────────────────────────────────────────────────────────┐
│  EXECUTE, ON A COMPUTING DEVICE, A PROCESS RUNNING IN A FIRST       │
│  CONTAINER ASSIGNED TO A FIRST NAMESPACE, THE FIRST CONTAINER       │
│  BEING ASSIGNED A FIRST PRIVILEGE THAT RESTRICTS ACCESS BY THE      │
│  FIRST CONTAINER TO THE FIRST NAMESPACE                             │
│                              302                                    │
└─────────────────────────────────────────────────────────────────────┘
                                 │
                                 ▼
┌─────────────────────────────────────────────────────────────────────┐
│  EXECUTE, ON THE COMPUTING DEVICE, A NAMESPACE SERVICE BEING        │
│  ASSIGNED A SECOND PRIVILEGE THAT ALLOWS THE NAMESPACE SERVICE      │
│  ACCESS TO THE FIRST NAMESPACE AND A SECOND NAMESPACE               │
│                              304                                    │
└─────────────────────────────────────────────────────────────────────┘
                                 │
                                 ▼
┌─────────────────────────────────────────────────────────────────────┐
│  SEND, TO THE NAMESPACE SERVICE AND FROM THE PROCESS, A REQUEST     │
│  CREATE A SOCKET IN THE SECOND NAMESPACE TO ALLOW THE PROCESS TO    │
│  COMMUNICATE WITH A SECOND CONTAINER ASSIGNED TO THE SECOND         │
│  NAMESPACE                                                          │
│                              306                                    │
└─────────────────────────────────────────────────────────────────────┘
                                 │
                                 ▼
┌─────────────────────────────────────────────────────────────────────┐
│  RECEIVE, AT THE PROCESS AND FROM THE NAMESPACE SERVICE, A FILE     │
│  DESCRIPTOR ASSOCIATED WITH THE SOCKET AND A THIRD PRIVILEGE THAT   │
│  ALLOWS THE PROCESS TO UTILIZE THE SOCKET                           │
│                              308                                    │
└─────────────────────────────────────────────────────────────────────┘
```

FIG. 3

PROVIDING MULTIPLE NAMESPACES

TECHNICAL FIELD

The present disclosure relates generally to providing a process with access to multiple namespaces by utilizing a service with privileges to create a socket in any namespace on a computing device and provide access to the socket to a separate namespace on the computing device.

BACKGROUND

Cloud computing provides users with access to computing resources to fulfill users' computing resource needs. In some examples, service providers can manage and provide cloud computing resources to users to fulfill their needs without the users having to invest in and maintain their own computing infrastructure. Cloud computing often involves the use of networks of data centers which house servers, routers, and other devices that provide computing resources to users such as compute resources, networking resources, storage resources, database resources, application resources, and so forth.

To support an application or a workload using cloud computing, application containerization techniques are employed as a packaging mechanism to abstract applications from the environment in which they actually run. Often, a single physical server may run multiple applications or services using virtualization techniques, such as virtual machines or application containers or services. Containers provide for a clean separation between applications, services, and other network workloads, allowing for a lightweight implementation to ensure security between containerized workloads. Some container-orchestration systems, such as, for example, Kubernetes, employ network policies using namespaces to ensure containers assigned to different namespaces cannot interfere with each other. For example, a container may be assigned a namespace configured to deny traffic from other namespaces while allowing traffic coming from the same namespace that a container was assigned to.

When running particular network workloads (e.g., virtual network functions on virtual machines, containers, etc.) with a certain set of features, it may be found that virtual network functions (VNFs) use the Berkley Software Distribution (BSD) socket API mostly or exclusively for communication, and must reside in different Virtual Routing and Forwarding (VRF) instances (e.g., different interfaces in different VRFs in the network). However, some container-orchestration systems, such as Kubernetes, may limit the functionality of some applications, such that the containers prevent access to multiple namespaces (the standard Linux best practice for separating interfaces and routing tables). There may be techniques, such as elevating privileges to break containment, allowing this to be solved. However, these techniques often require giving one application control over the container platform, therefore complicating support to the point that allowing multiple VNFs from disparate service providers on the same container platform would be, in practice, rejected.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 1 illustrates a system-architecture diagram of an example flow for an environment in which a namespace service provides a socket, created in a namespace, and rights to utilize the socket to a containerized process assigned to a separate namespace.

FIG. 2 illustrates a flow diagram of an example method for a namespace service to receive, from a containerized process assigned to a namespace, a request to create a socket in a separate namespace and provide the socket file descriptor to the containerized process.

FIG. 3 illustrates a flow diagram of an example method for a containerized process, assigned to a namespace, to send, to a namespace service, a request to create a socket in a separate namespace, and receive the socket file descriptor from the namespace service.

DESCRIPTION OF EXAMPLE EMBODIMENTS

Overview

Figure 4:
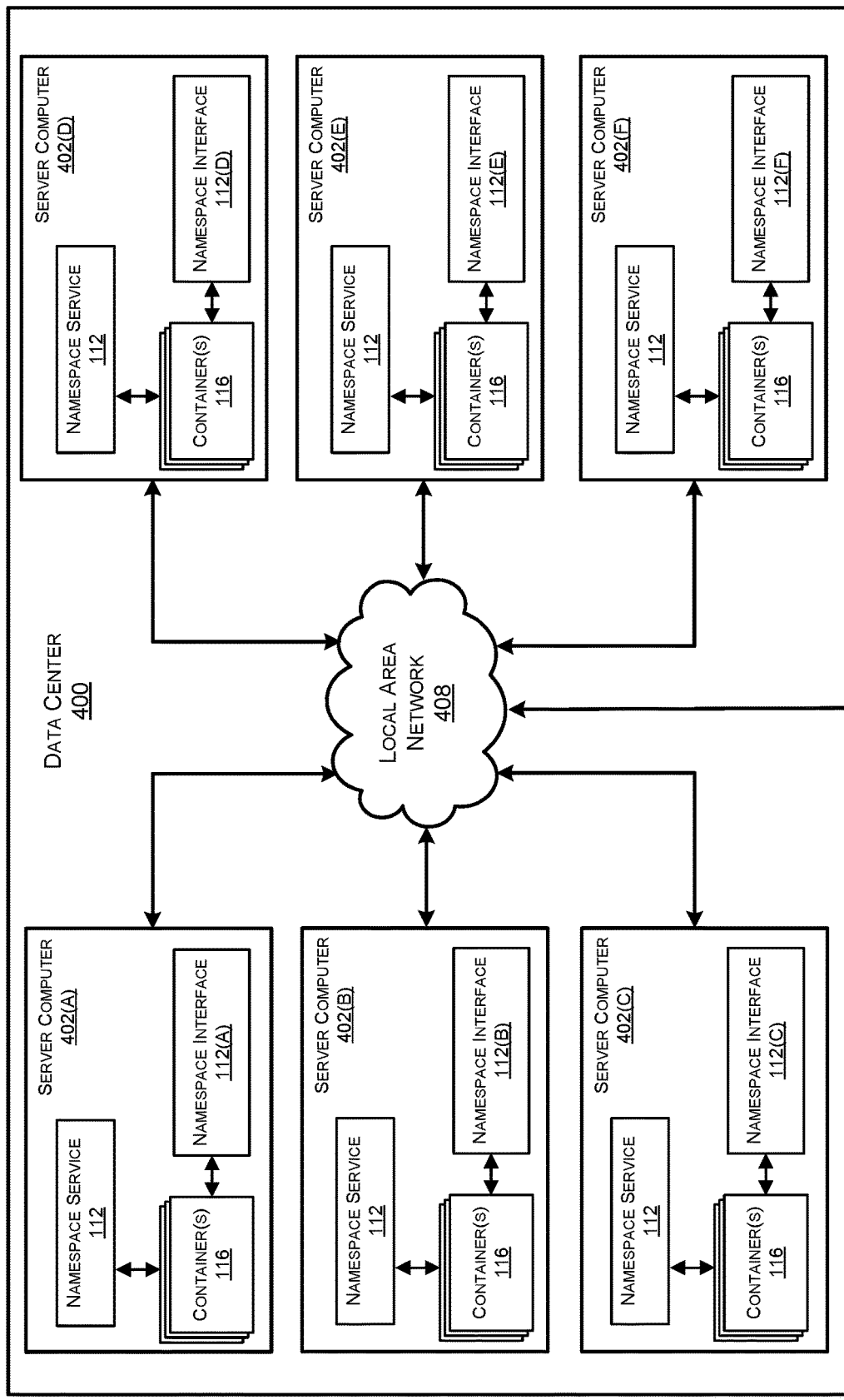
FIG. 4 illustrates a computing system diagram illustrating a configuration for a data center that can be utilized to implement aspects of the technologies disclosed herein.

This disclosure describes techniques for executing, on a physical server, a namespace service configured to create namespaces and provide a socket from a namespace to a separate namespace. The method includes executing, on a computing device, a process running in a first container assigned to a first namespace, the first container being assigned a first privilege that restricts access by the first container to the first namespace. The method further includes executing, on the computing device, a namespace service being assigned a second privilege that allows the namespace service access to the first namespace and a second namespace. The method further includes receiving, at the namespace service, a request from the process to create a socket in the second namespace to allow the process to communicate with a second container assigned to the second namespace. The method further includes creating, by the namespace service, the socket in the second namespace. The method further includes providing, from the namespace service to the process, a file descriptor associated with the socket.

Additionally, or alternatively, the method includes executing, on a computing device, a process running in a first container assigned to a first namespace, the first container being assigned a first privilege that restricts access by the first container to the first namespace. The method further includes executing, on the computing device, a namespace service being assigned a second privilege that allows the namespace service access to the first namespace and a second namespace. The method further includes sending, to the namespace service and from the process, a request to create a socket in the second namespace to allow the process to communicate with a second container assigned to the second namespace. The method further includes receiving, at the process and from the namespace service, a file descriptor associated with the socket and a third privilege that allows the process to utilize the socket.

Additionally, the techniques described herein may be performed by a system and/or device having non-transitory computer-readable media storing computer-executable instructions that, when executed by one or more processors, performs the method described above.

Example Embodiments

Generally, containerization techniques are utilized in cloud computing networks to separate applications, services, and other network workloads to ensure security and avoid interference between applications. Some container-orchestrated systems, such as, for example, Kubernetes, employ network policies using namespaces to ensure containers residing in different namespaces do not interfere with one another. For example, each Virtual Routing and Forwarding (VRF) instance on the platform may be mapped to a corresponding namespace. Namespaces may be populated with network interfaces, such as, for example, external network interfaces transferred from a default namespace into the newly created namespace, loopback interfaces created in the namespace, and the like. In some examples, a container may be assigned to a namespace configured to deny traffic from different namespaces while allowing traffic coming from the same namespace that the container was assigned.

Some container-orchestration systems, such as Kubernetes, may limit the functionality of some applications, such that the containers prevent access to multiple namespaces (the standard Linux best practice for separating interfaces and routing tables). However, in some examples, an application may wish to use multiple network namespaces. For example, an application may desire to communicate with users of the application, while being controlled by communications from an admin of the application. To ensure security and avoid interference, the application may be containerized, and bounded from other applications on the platform. However, the containerized application may lack the privileges required to create or obtain a file descriptor for a socket in a separate namespace. There may be techniques, such as elevating privileges to break containment, allowing this to be solved. However, these techniques often require giving one application control over the container platform therefore complicating support to the point that allowing multiple VNFs from disparate service providers on the same container platform would be, in practice, rejected. Additionally, escalating privileges of an application in this manner may result in interference with other applications and security risks, among other things.

This disclosure describes techniques for providing multiple namespace support to application(s) in containers under Kubernetes without breaking containment boundaries or escalating privileges of the application(s). As noted above, container-orchestration systems, such as Kubernetes, prevent access to multiple namespaces from a single container, and applications within such containers generally do not have privileges required to access and/or create sockets in separate namespaces. The techniques described herein include executing a namespace service on a computing device. The namespace service may have a connection, such as, for example, a Unix Domain Socket (UDS), connecting each container executing on the computing device that consumes the UDS to the namespace service. The namespace service may have escalated capabilities in the system, allowing for the namespace service to perform various operations that other applications in the system are not capable of performing, such as, for example, interface configuration, administration of IP firewalls, modifying routing tables, and the like (i.e., CAP_NET_ADMIN capabilities in Linux systems). The namespace service may handle request(s), received via an associated first UDS connection, from process(es) assigned to a first namespace requesting a new socket in a second namespace. The namespace service may verify credentials and determine the process should be allowed access to the second namespace and may create and obtain the file descriptor for a socket in the second namespace, via an associated second UDS connection connecting the second namespace to the namespace service. The namespace service may then transfer the file descriptor and rights to utilize the socket to the process in the first namespace, via the first UDS connection, allowing the process to utilize both the first namespace and the second namespace, without escalating the privileges of the process.

In some examples, a namespace service is executed when a physical server boots up. The system may allow the namespace service to execute in various ways, such as, but not limited to, executing as a system process, on a virtual machine, as an application, as a containerized application, and the like. The namespace service may have escalated capabilities in the system, allowing for the namespace service to perform various operations that other applications in the system are not capable of performing. In some examples, the namespace service may run with root privileges, providing the namespace service with a number of escalated capabilities, such as, for example, the Linux CAP_NET_ADMIN capability. Upon execution, the namespace service may obtain information from an additional service, configured to create namespaces when the physical server boots up, informing the namespace service of the namespaces on the system. In some examples, the namespace service may utilize a namespace is statically created and defined by a configuration file. For example, a configuration file may include preferences associated with the namespace, such as, for example, interfaces that are associated with the namespace, routing tables associated with the namespace, etc. Additionally, or alternatively, the namespace service may be configured to dynamically change a namespace, or utilize an additional service configured to dynamically change the namespace and may change the preferences defined by the associated configuration file. In some examples, the namespace service may create a Unix Domain Socket (UDS) to access each namespace in the system. In some examples, when a container is deployed in the system, the container may be configured such that upon execution, the UDS is consumed by the container such that an application executing in the container may communicate with the namespace service, regardless of the namespace it is assigned to. In some examples, the UDS is deployed within the filesystem of each container on the physical server.

A process (or an application) may begin execution in a first container on the physical server. In some examples, the first container may be assigned to a first namespace. Additionally, or alternatively, the first container may be assigned a first level of privileges (or capabilities) restricting access by the first container to the first namespace, such that processes and applications executing in the first container may not access an additional namespace. The first namespace may utilize an interface to communicate with other processes and applications. Additionally, or alternatively, the first container may include the UDS, such that the first container may communicate with the namespace service via the UDS. In some examples, the UDS may be consumed, or utilized, by any process and/or application that is executing in the first container.

In some examples, the process running in the first container may obtain access to a socket in a second namespace that the first container is restricted from accessing. For example, the process may utilize the UDS to send a request to the namespace service requesting that a socket be created in the second namespace. Additionally, or alternatively, the request may include desired properties associated with the socket, the properties may include but are not limited to a desired internet protocol version, a datagram or a stream socket, or any other property associated with sockets. In some examples, the namespace service may perform a number of authorization checks associated with the process requesting the socket. For example, the namespace service may verify that the second namespace does not include any restrictions with respect to the process and/or the first namespace. Additionally, or alternatively, the namespace service may verify that the second namespace does not include restrictions to any outside namespaces. Additionally, or alternatively, the namespace service may verify that at least one container assigned to the second namespace includes a UDS such that the namespace service may transmit the instructions to create the socket to the second namespace via the UDS.

In some examples, the namespace service may send instructions to create the socket in the second namespace via the UDS. Additionally, or alternatively, the second namespace may create the socket under the control of the namespace service. In some examples, the namespace service may send properties associated with the socket to the second namespace, such that when the socket is created, the socket includes the desired properties. The second namespace may then generate a rights object, including a permission to utilize the newly created socket. In some examples, the rights object may permit only the process to utilize the socket. Additionally, or alternatively, the right object may permit any process associated with the first namespace to utilize the socket. The namespace service may receive a file descriptor associated with the socket from the second namespace, via the UDS. In some examples, the second namespace may transfer the rights object to the namespace service via the UDS.

The namespace service may send the file descriptor associated with the socket to the process in the first container assigned to the first namespace, via the UDS. Additionally, or alternatively, the namespace service may transfer the rights object to the process via the UDS. Additionally, or alternatively, the namespace service may transfer the rights object to the first namespace.

The process may utilize the file descriptor to access the newly created socket in the second namespace. Utilizing the socket in the second namespace, the process may utilize the second namespace interface, allowing the process assigned to the first namespace to access ports that only processes assigned to the second namespace have privileges to access. In some examples, the first container may utilize the rights object to permit the process to utilize the socket. Additionally, or alternatively, the first container may consume the rights object, such that the privileges associated with the first container are elevated. For example, following consumption of the rights object, the privileges associated with the first container may be escalated to allow the processes in the first container to access multiple namespaces, such as, the first namespace, provided by the Container Network Interface (CNI) associated with the first container, and the second namespace, without escalating the privileges of the process (e.g., escalating the process privileges to a global root and/or CAP_NET_ADMIN level).

The techniques described herein provide various improvements and efficiencies with respect to containerized applications. For example, the techniques described herein may allow unprivileged containerized applications access to multiple namespaces without escalating privileges of the application to an unsafe level. Further, security between workloads in different containers is maintained, and network interference is avoided by utilizing a single namespace service running on a physical server.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example flow for an environment 100 in which a namespace service provides a socket, created in a namespace, and rights to utilize the socket to a containerized process assigned to a separate namespace within a cloud computing network 102. The cloud computing network 102 may comprise one or more data centers 104 that include various networking devices, such as, for example, physical servers 106. The data center(s) 104 may be located across geographic areas, and the cloud computing network 102 may be a distributed network through which users (often customers) may interact via user devices to manage or otherwise interact with a service provided by the cloud computing network 102.

The cloud computing network 102 may provide on-demand availability of computing system resources of physical server(s) 106, such as data storage, computing power (e.g., CPU, GPU, etc.), networking, databases, etc., without direct active management by users. In some examples, the cloud computing network 102 may be managed and maintained by a service provider such that users do not have to invest in and maintain the computing infrastructure for their computing resource needs. Generally, a user may be provided access to, or allocated use of, a portion of the computing resources of physical server(s) 106 in the cloud computing network 102. The cloud computing network 102 may scale, such as by spinning up resources or spinning down resources, based on demand for the individual users. The portions of the cloud computing network 102 may be allocated using hardware virtualization such that portions of the cloud computing network 102 can be configured and managed by the user (e.g., security configuration, load balancing configuration, etc.). However, the cloud computing network 102 need not be managed by a service provider, and can be managed by any entity, including the user themselves that run the applications or services.

In some examples, physical server(s) 106 may host one or more virtual containers 108(1)-(N), where N is any integer greater than "1." Each container 108 may be configured to execute one of various operations and act as one or more virtual components for the cloud computing network 102. In some examples, the containers 108(1)-(N) in the cloud computing network 102 may host at least one process 110(1)-(N) and may include a container network interface (CNI) 112(1)-(N), where N is any integer greater than "1." Additionally, or alternatively, physical server(s) 106 may host one or more namespace(s) 114. In some examples, container(s) 108 may be assigned to a namespace 114. In some examples, the container(s) 108 may be assigned to a namespace 114, based at least partly on the CNI 112, such that the CNI 112 is configured to interact with the assigned namespace 114.

In some examples, the physical server(s) 106 may host a namespace service 116. In some examples, the namespace service 116 may have escalated capabilities in the physical server, allowing for the namespace service to perform various operations that other process(es) 110 in the system are not capable of performing. In some examples, the namespace service 116 may run with root privileges, providing the namespace service 116 with a number of escalated capabilities, such as, for example, the Linux CAP_NET_ADMIN capability, allowing the namespace service 116 to access and perform various actions in multiple namespace(s) 114 running on the physical server 106. Additionally, or alternatively, the namespace service 116 may have a connection, such as, for example, a Unix Domain Socket (UDS) 118, connecting each container 108 executing on the physical server 106 that consumes the UDS 118 to the namespace service 116.

Generally, the number of containers 108 may scale based on a number of users 120 interacting with the cloud computing network 102. The users 120 may comprise one or more of individual users, groups of users, organizations, businesses, or other entities that interact with the cloud computing network 102 via respective user devices. The user devices may be any type of computing device capable of connecting to the cloud computing network 102 via a suitable data communications network 122 such as, but not limited to, a laptop or desktop computer, a tablet computing device, a server computer, a television, or a mobile telephone. Administrative users employed by the operator of the cloud computing network 102, such as administrators managing the operation of the cloud computing network 102, might also connect with, manage, and utilize resources provided by the service provider network 102 in a similar fashion.

The users 120 may provide input data 124 via the network(s) 122 to interact with the service that is supported by the container(s) 108 running on the servers 106. For example, the users 120 may submit requests to process data, retrieve data, store data, and so forth such that virtual machines hosting the container(s) 108 are spun up or spun down to process the requests based on demand.

When a physical server 106(1) boots up, the namespace service 116 may begin execution. The namespace service 116 may execute on the physical server in various ways, such as, but not limited to, executing a system process, on a virtual machine, as an application, as a containerized application, and the like, without limitation by any method. Upon execution, the namespace service 116 may be configured to obtain information from an additional service, and/or identify the information utilizing a configuration file. The information may include identifiers for the namespaces 114 in the system and may be utilized by the namespace service 116 to identify each of the namespaces 114 executing on the physical server. In some examples, the namespace service 116 may utilize a namespace 114 is statically created and defined by a configuration file. For example, a configuration file may include preferences associated with the namespace 114, such as, for example, interfaces that are associated with the namespace 114, routing tables associated with the namespace 114, and the like. Additionally, or alternatively, the namespace service 116 may be configured to dynamically change a namespace 114, or utilize an additional service configured to dynamically change the namespace 114 and may change the preferences defined by the associated configuration file. The namespace service 116 may then create a Unix Domain Socket (UDS) 118 to access each namespace 114 (e.g., namespace A and namespace B) in the system. In some examples, when a container 108(1),(2) is deployed in the system, the container 108(1),(2) may be configured such that, upon execution, the UDS 118 is consumed by the container 108(1),(2), creating an endpoint in the filesystem of the container(s) 108(1),(2), allowing for communications to be passed between the namespace service 116 and the container(s) 108(1),(2) via the UDS 118. Additionally, or alternatively, the UDS 118 endpoint may disposed within the filesystem of the container(s) 108(1),(2) upon configuration.

When a process 110(1) executes in a container 108(1) assigned to namespace A 114, the CNI 112(1) is utilized by the container 108(1) to facilitate communications received at and sent from the process 110(1) in namespace A 114. However, the process 110(1) is restricted by the container 108(1), and is unable to send and/or receive communications in namespace B 114. Additionally, or alternatively, the container 108(1) may be assigned a first level of privileges (or capabilities) restricting access by the container 108(1) to the namespace A, such that processes and/or applications executing in the container 108(1) may not access namespace B 114.

In some examples, the process 110(1) running in the container 108(1) may obtain access to a socket in namespace B 114 that the container 110(1) is restricted from accessing. For example, the process 110(1) may utilize the UDS 118(1) to send a request to the namespace service 116 requesting that a socket be created in namespace B 114. Additionally, or alternatively, the request may include desired properties associated with the socket, the properties may include but are not limited to a desired internet protocol version, a datagram or a stream socket, or any other property associated with sockets. In some examples, the namespace service 116 may perform a number of authorization checks associated with the process 110(1) requesting the socket. For example, the namespace service 116 may verify that namespace B 114 does not include any restrictions with respect to the process 110(1) and/or namespace A. For example, the namespace service 116 may perform various authorization checks. Additionally, or alternatively, the namespace service 116 may verify that namespace B 114 does not include restrictions to any outside namespaces (e.g., namespace A). Additionally, or alternatively, the namespace service 116 may verify that at least one container 108(2) assigned to namespace B 114 includes a UDS 118(2) such that the namespace service 116 may transmit the instructions to create the socket to namespace B 114 via the UDS 118(2).

The namespace service 116 may send instructions to create the socket in namespace B 114 via the UDS 118(2). Additionally, or alternatively, namespace B 114 may create the socket under the control of the namespace service 116. In some examples, the namespace service 116 may send properties associated with the socket to namespace B 114, such that when the socket is created, the socket includes the desired properties. Namespace B 114 may then generate a rights object, including a permission to utilize the newly created socket. In some examples, the rights object may permit only the process 110(1) to utilize the socket. Additionally, or alternatively, the rights object may permit any process 110 associated with namespace A 114 to utilize the socket. Additionally, or alternatively, the rights object may permit any process 110 associated with the container 108(1) to utilize the socket. The namespace service 116 may receive a file descriptor associated with the socket from namespace B 114, via the UDS 118(2). In some examples, namespace B 114 may transfer the rights object to the namespace service via the UDS 118(2).

The namespace service 116 may send the file descriptor associated with the socket to the process 110(1) in the container 108(1) assigned to namespace A, via the UDS 118(1). Additionally, or alternatively, the namespace service 116 may transfer the rights object to the process 110(1) via the UDS 118(1). Additionally, or alternatively, the namespace service 116 may transfer the rights object to namespace A 114, via the UDS 118(1).

The process may utilize the file descriptor to access the newly created socket in namespace B 114. Utilizing the socket in namespace B 114, the process 110(1) may utilize interfaces only accessible in namespace B 114, allowing the process 110(1) assigned to namespace A to access ports that only processes 110(2),(3) assigned to namespace B 114 have privileges to access. In some examples, the container 108(1) may utilize the rights object to permit the process 110(1) to utilize the socket. Additionally, or alternatively, the container 108(1) may consume the rights object, such that the privileges associated with the container 108(1) are elevated. For example, following consumption of the rights object, the privileges associated with the container 108(1) may be escalated to allow the process(es) 110(1) in the container 108(1) to access multiple namespaces, such as, namespace A 114, provided by the Container Network Interface (CNI) 112(1) associated with the container 108(1), and namespace B 114, without escalating the privileges of the process 110(1) (e.g., escalating the process privileges to a global root and/or CAP_NET_ADMIN level).

At "1," the namespace service 116 may begin execution on a physical server 106 in the cloud computing environment 102. In some examples, the namespace service 116 may execute on each of the physical server(s) 106 in the cloud computing environment 102. In some examples, the namespace service 116 may have a level of privilege or capability that allows the namespace service 116 access to namespace A and namespace B. In some examples, the level of privilege or capability may correspond to global root and/or CAP_NET_ADMIN privilege level(s).

At "2," a process 110(1) may begin running in a container 108(1) on the physical server 106. In some examples, the container 108(1) may be assigned to namespace A 114. Additionally, or alternatively, the container 108(1) may be assigned to a default namespace upon execution and may be assigned to namespace A 114 at a later time. In some examples, the container 108(1) may be associated with a level of privilege or capability that restricts access by the container 108(1) to namespace A 114.

At "3," the namespace service 116 may receive a request from the process 110(1) executing in the container 108(1) in namespace A 114. In some examples, the request may include a request to create a socket in namespace B 114, such that the process 110(1) in namespace A 114 may communicate with a container 108(2) in namespace B 114 without escalating the privileges of the process 110(1) and/or the container 108(1) with respect to the system. In some examples, the namespace service 116 may receive the request from the process 110(1) via the Unix Domain Socket (UDS) 118(1). In some examples, the namespace service 116 may perform various authorization operations associated with the process 110(1) requesting the socket. In some examples, the request may include information used to defined properties associated with the socket.

At "4," the namespace service 116 may create the socket in namespace B 114. In some examples, the namespace service 116 may send instructions to create the socket in namespace B 114 via the UDS 118(2). Additionally, or alternatively, namespace B 114 may create the socket under the control of the namespace service 116. In some examples, the namespace service 116 may send properties associated with the socket to namespace B 114, such that when the socket is created, the socket includes the desired properties.

At "5," the namespace service 116 may provide the process 110(1) with information required to utilize the socket. In some examples, the namespace service 116 may send the file descriptor associated with the socket to the process 110(1), via the UDS 118(1). In some examples, the namespace service 116 may provide the process 110(1) with a rights object associated with the socket, such that the rights object allows the process 110(1) to utilize the socket in namespace B 114.

FIGS. 2 and 3 illustrate flow diagrams of example methods 200 and 300 that illustrate aspects of the functions performed at least partly by the cloud computing network 102 as described in FIG. 1. The logical operations described herein with respect to FIGS. 2 and 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 2 and 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 2 illustrates a flow diagram of an example method for a namespace service to receive, from a process in a container and assigned to a namespace, a request to create a socket in a separate namespace and provide the socket file descriptor to the containerized process. The process may be executing on one or more processors of a physical server 106 that is included in the cloud computing network 102. The physical server 106 may comprise the one or more processors and one or more non-transitory computer-readable media storing computer-executable instructions (e.g., process 110, container 108, namespace 114, etc.) that, when executed by the one or more processors, cause the one or more processors to perform the method 200.

At 202, a process 110(1) may execute, on a computing device 106 in the cloud computing network 102. In some examples, the process 110(1) may be running in a container 108(1) that is assigned to a first namespace (namespace A 114). Additionally, or alternatively, the container 108(1) may be assigned to a default namespace upon execution and may be assigned to the first namespace at a later time. In some examples, the container 108(1) may be assigned a first privilege that restricts access by the container 108(1) to the first namespace.

At 204, a namespace service 116 may begin execution on the computing device 106 in the cloud computing environment 102. In some examples, the namespace service 116 may execute on each of the physical server(s) 106 in the cloud computing environment 102. In some examples, the namespace service 116 may be assigned a level of privilege or capability that allows the namespace service 116 access to the first namespace (namespace A 114) and a second namespace (namespace B 114). In some examples, the level of privilege or capability may correspond to global root and/or CAP_NET_ADMIN privilege level(s).

At 206, the namespace service 116 may receive a request from the process 110(1) executing in the container 108(1) in the first namespace. In some examples, the request may include a request to create a socket in the second namespace, such that the process 110(1) in the first namespace may communicate with a container 108(2) in the second namespace without escalating the privileges of the process 110(1) and/or the container 108(1) with respect to the system. In some examples, the namespace service 116 may receive the request from the process 110(1) via the Unix Domain Socket (UDS) 118(1). In some examples, the namespace service 116 may perform various authorization operations associated with the process 110(1) requesting the socket. In some examples, the request may include information used to defined properties associated with the socket.

At 208, the namespace service 116 may create the socket in the second namespace. In some examples, the namespace service 116 may send instructions to create the socket in the second namespace via the UDS 118(2). Additionally, or alternatively, the second namespace may create the socket under the control of the namespace service 116. In some examples, the namespace service 116 may send properties associated with the socket to the second namespace, such that when the socket is created, the socket includes the desired properties.

At 210, the namespace service 116 may provide the process 110(1) with information required to utilize the socket. In some examples, the namespace service 116 may send the file descriptor associated with the socket to the process 110(1), via the UDS 118(1). In some examples, the namespace service 116 may provide the process 110(1) with a rights object associated with the socket, such that the rights object allows the process 110(1) to utilize the socket in the second namespace.

FIG. 3 illustrates a flow diagram of an example method 300 for a containerized process, assigned to a namespace, to send, to a namespace service, a request to create a socket in a separate namespace, and receive the socket file descriptor from the namespace service.

At 302, a process 110(1) may execute, on a computing device 106 in the cloud computing network 102. In some examples, the process 110(1) may be running in a first container 108(1) that is assigned to a first namespace (namespace A 114). Additionally, or alternatively, the container 108(1) may be assigned to a default namespace upon execution and may be assigned to the first namespace at a later time. In some examples, the container 108(1) may be assigned a first privilege that restricts access by the container 108(1) to the first namespace.

At 304, a namespace service 116 may begin execution on the computing device 106 in the cloud computing environment 102. In some examples, the namespace service 116 may execute on each of the physical server(s) 106 in the cloud computing environment 102. In some examples, the namespace service 116 may be assigned a level of privilege or capability that allows the namespace service 116 access to the first namespace (namespace A 114) and a second namespace (namespace B 114). In some examples, the level of privilege or capability may correspond to global root and/or CAP_NET_ADMIN privilege level(s).

At 306, the process 110(1) executing in the first container 108(1) in the first namespace (namespace A 114) may send, to the namespace service 116, a request to create a socket in the second namespace (namespace B 114) to allow the process 110(1) to communicate with a second container 108(2) assigned to the second namespace. In some examples, the process 110(1) may send the request to the namespace service 116 via the Unix Domain Socket (UDS) 118(1). In some examples, the request may include information used to defined properties associated with the socket.

At 308, the process 110(1) may receive, from the namespace service 116, information to utilize the socket via the UDS 118(1). In some examples, the process 110(1) may receive the file descriptor associated with the socket. In some examples, the process 110(1) may receive, from the namespace service 116, a rights object associated with the socket, such that the rights object allows the process 110(1) to utilize the socket in the second namespace.

FIG. 4 is a computing system diagram illustrating a configuration for a data center 400 that can be utilized to implement aspects of the technologies disclosed herein. The example data center 400 shown in FIG. 5 includes several server computers 402A-402E (which might be referred to herein singularly as "a server computer 402" or in the plural as "the server computers 402") for providing computing resources. In some examples, the server computers 402 may include, or correspond to, the servers 106 described herein.

The server computers 402 can be standard tower, rack-mount, or blade server computers configured appropriately for providing the computing resources described herein. As mentioned above, the computing resources provided by the cloud computing network 102 can be data processing resources such as VM instances or hardware computing systems, database clusters, computing clusters, storage clusters, data storage resources, database resources, networking resources, and others. Some of the servers 402 can also be configured to execute a resource manager capable of instantiating and/or managing the computing resources. In the case of VM instances, for example, the resource manager can be a hypervisor or another type of program configured to enable the execution of multiple VM instances on a single server computer 402. Server computers 402 in the data center 400 can also be configured to provide network services and other types of services.

Figure 5:
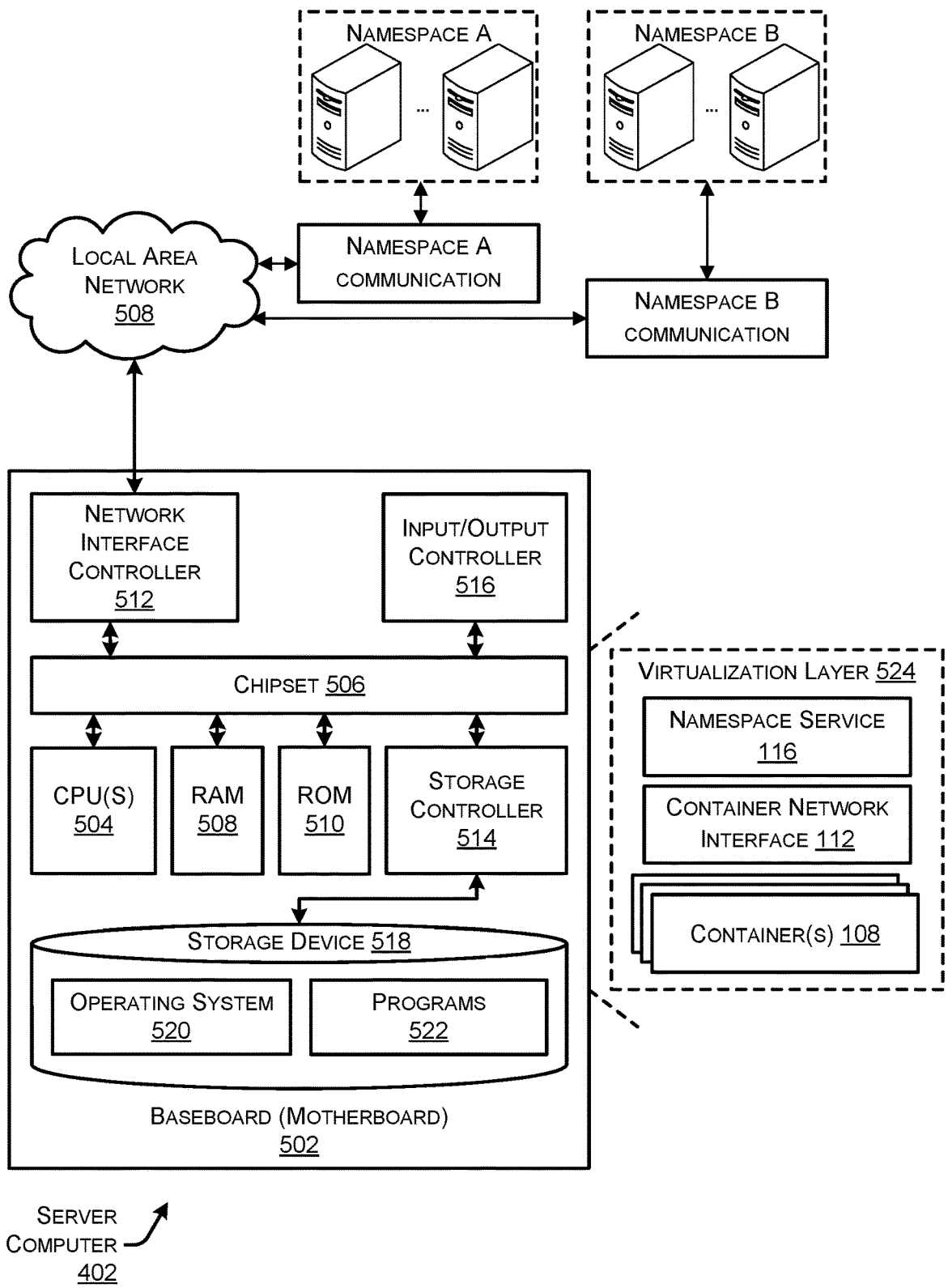
FIG. 5 is a computer architecture diagram showing an illustrative computer hardware architecture for implementing a server device that can be utilized to implement aspects of the various technologies presented herein.

In the example data center 400 shown in FIG. 5, an appropriate LAN 408 is also utilized to interconnect the server computers 402A-402E. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the server computers 402A-402E in each data center 400, and, potentially, between computing resources in each of the server computers 402. It should be appreciated that the configuration of the data center 400 described with reference to FIG. 5 is merely illustrative and that other implementations can be utilized.

In some examples, the server computers 402 may each execute one or more containers 108 that support a service or application provisioned across a set or cluster of servers 402. The virtual endpoints 112 on each server computer 402 may support a single application or service, or multiple applications or services (for one or more users).

In some instances, the cloud computing network 102 may provide computing resources, like application containers, VM instances, and storage, on a permanent or an as-needed basis. Among other types of functionality, the computing resources provided by the cloud computing network 102 may be utilized to implement the various services described above. The computing resources provided by the cloud computing network 102 can include various types of computing resources, such as data processing resources like application containers and VM instances, data storage resources, networking resources, data communication resources, network services, and the like.

Each type of computing resource provided by the cloud computing network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network 102 can also be configured to provide other types of computing resources not mentioned specifically herein.

The computing resources provided by the cloud computing network 102 may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

FIG. 5 shows an example computer architecture for a server computer 402 capable of executing program components for implementing the functionality described above. The computer architecture shown in FIG. 5 illustrates a conventional server computer, workstation, desktop computer, laptop, tablet, network appliance, e-reader, smartphone, or other computing device, and can be utilized to execute any of the software components presented herein. The server computer 402 may, in some examples, correspond to a physical server 108 described herein.

The computer 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 402. The chipset 506 can further provide an interface to a computer-readable storage medium such as a read-only memory ("ROM") 510 or non-volatile RAM ("NVRAM") for storing basic routines that help to startup the computer 402 and to transfer information between the various components and devices. The ROM 510 or NVRAM can also store other software components necessary for the operation of the computer 402 in accordance with the configurations described herein.

The computer 502 can operate in a networked environment using logical connections to remote computing devices and computer systems through a network, such as the network 408. The chipset 506 can include functionality for providing network connectivity through a NIC 512, such as a gigabit Ethernet adapter. The NIC 512 is capable of connecting the computer 402 to other computing devices over the network 408 (or 122). It should be appreciated that multiple NICs 512 can be present in the computer 402, connecting the computer to other types of networks and remote computer systems.

The computer 402 can be connected to a storage device 518 that provides non-volatile storage for the computer. The storage device 518 can store an operating system 520, programs 522, and data, which have been described in greater detail herein. The storage device 518 can be connected to the computer 402 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 402 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 402 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 can further read information from the storage device 518 by detecting the physical states or characteristics of one or more particular locations within the physical storage units.

In addition to the mass storage device 518 described above, the computer 402 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 402. In some examples, the operations performed by the cloud computing network 102, and or any components included therein, may be supported by one or more devices similar to computer 402. Stated otherwise, some or all of the operations performed by the cloud computing network 102, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 402. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 518 can store other system or application programs and data utilized by the computer 402.

In one embodiment, the storage device 518 or other computer-readable storage media is encoded with computer-executable instructions which, when loaded into the computer 402, transform the computer from a general-purpose computing system into a special-purpose computer capable of implementing the embodiments described herein. These computer-executable instructions transform the computer 402 by specifying how the CPUs 504 transition between states, as described above. According to one embodiment, the computer 402 has access to computer-readable storage media storing computer-executable instructions which, when executed by the computer 402, perform the various processes described above with regard to FIGS. 1-4. The computer 402 can also include computer-readable storage media having instructions stored thereupon for performing any of the other computer-implemented operations described herein.

The computer 402 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 402 might not include all of the components shown in FIG. 5, can include other components that are not explicitly shown in FIG. 5, or might utilize an architecture completely different than that shown in FIG. 5.

The server computer 402 may support a virtualization layer 524, such as one or more containers 108, a namespace service 116, and/or a container network interface 112 executing on the server computer 402. In some examples, the virtualization layer 524 may be supported by a hypervisor that provides one or more virtual machines running on the server computer 402 to perform functions described herein. The virtualization layer 524 may generally support a virtual resource that performs at least portions of the techniques described herein. A process contained by a container 108 may utilize rights and file descriptors associated with a socket in a separate namespace received from the namespace service 116, allowing the process 108 to send and receive communications to multiple namespaces.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more computer-readable media storing computer-executable instructions that, when executed by the one or more processors, cause the one or more processors to perform operations comprising:
   executing, on a computing device, a process running in a first container assigned to a first namespace, the first container being assigned a first privilege that restricts access by the first container to the first namespace;
   executing, on the computing device, a namespace service being assigned a second privilege that allows the namespace service access to the first namespace and a second namespace;
   creating, by the namespace service, a first socket in the first container;
   receiving, at the namespace service and via the first socket, a request from the process to create a second socket in a second container assigned to the second namespace, the second socket allowing the process to access the second namespace from outside of the second container without escalating the first privilege associated with the first process;

creating, by the namespace service, the second socket in the second container; and providing, from the namespace service and to the process via the first socket, a file descriptor associated with the second socket, the file descriptor being associated with a third privilege allowing the process to access a network interface associated with the second namespace.

2. The system of claim 1, wherein:

the namespace service is communicatively coupled to the first namespace and the second namespace via a Unix Domain Socket (UDS); and the second socket is an Internet Protocol (IP) socket.

3. The system of claim 1, wherein the request includes credentials associated with the process, and the operations further comprising determining, at the namespace service, that the process requires access to the second container, based at least in part on the credentials.

4. The system of claim 1, wherein the request includes an identifier of the second namespace and one or more properties associated with the second socket.

5. The system of claim 1, wherein the second privilege includes root privileges associated with the computing device.

6. The system of claim 1, the operations further comprising:

sending, from the namespace service and to the second namespace, a request to create the second socket; and receiving, at the namespace service and from the second namespace, the file descriptor associated with the second socket.

7. The system of claim 1, the operations further comprising receiving, at the process and from an additional process, a communication via the second socket in the second namespace.

8. A method comprising:

executing, on a computing device, a process running in a first container assigned to a first namespace, the first container being assigned a first privilege that restricts access by the first container to the first namespace;

executing, on the computing device, a namespace service being assigned a second privilege that allows the namespace service access to the first namespace and a second namespace;

creating, by the namespace service, a first socket in the first container;

receiving, at the namespace service and via the first socket, a request from the process to create a second socket in a second container assigned to the second namespace, the second socket allowing the process to access the second namespace from outside of the second container without escalating the first privilege associated with the first process;

creating, by the namespace service, the second socket in the second container; and providing, from the namespace service and to the process via the first socket, a file descriptor associated with the second socket, the file descriptor being associated with a third privilege allowing the process to access a network interface associated with the second namespace.

9. The method of claim 8, wherein the request includes credentials associated with the process, and further comprising determining, at the namespace service, that the process requires access to the second container, based at least in part on the credentials.

10. The method of claim 8, wherein the request includes an identifier of the second namespace and one or more properties associated with the second socket.

11. The method of claim 8, wherein the second privilege includes root privileges associated with the computing device.

12. The method of claim 8, further comprising:

sending, from the namespace service and to the second namespace, a request to create the second socket; and receiving, at the namespace service and from the second namespace, the file descriptor associated with the second socket.

13. The method of claim 8, further comprising receiving, at the process and from an additional process, a communication via the second socket in the second namespace.

14. The method of claim 8, wherein:

the namespace service is communicatively coupled to the first namespace and the second namespace via a Unix Domain Socket (UDS); and the second socket is an Internet Protocol (IP) socket.

15. A method comprising:

executing, on a computing device, a process running in a first container assigned to a first namespace, the first container being assigned a first privilege that restricts access by the first container to the first namespace;

executing, on the computing device, a namespace service being assigned a second privilege that allows the namespace service access to the first namespace and a second namespace;

creating, by the namespace service, a first socket in the first container;

sending, to the namespace service and from the process via the first socket, a request to create a second socket in a second container assigned to the second namespace the second socket allowing the process to access the second namespace from outside of the second container and without escalating the first privilege associated with the first process; and receiving, at the process and from the namespace service via the first socket, a file descriptor associated with the second socket and a third privilege that allows the process to access a network interface associated with the second namespace.

16. The method of claim 15, wherein the first privilege includes more favorable access rights than the second privilege.

17. The method of claim 15, further comprising receiving, at the process and from an additional process, a communication via the second socket in the second namespace.

18. The method of claim 15, wherein:

the namespace service is communicatively coupled to the first namespace and the second namespace via a Unix Domain Socket (UDS); and the second socket is an Internet Protocol (IP) socket.

19. The method of claim 15, wherein the request includes credentials associated with the process, the credentials including an indication that the process requires access to the second container.

20. The method of claim 15, further comprising receiving, at the process and from an additional process running in the second container, a communication via the second socket.

* * * * *